United States Patent [19]

Phillips et al.

[11] Patent Number: 5,426,743
[45] Date of Patent: * Jun. 20, 1995

[54] 3-1 ARITHMETIC LOGIC UNIT FOR SIMULTANEOUS EXECUTION OF AN INDEPENDENT OR DEPENDENT ADD/LOGIC INSTRUCTION PAIR

[75] Inventors: James E. Phillips, Binghamton; Stamatis Vassiliadis, Vestal, both of N.Y.

[73] Assignee: International Business Machines Corporation, Armonk, N.Y.

[ * ] Notice: The portion of the term of this patent subsequent to Mar. 29, 2011 has been disclaimed.

[21] Appl. No.: 186,224

[22] Filed: Jan. 24, 1994

Related U.S. Application Data

[63] Continuation of Ser. No. 906,631, Jun. 30, 1992, abandoned, which is a continuation-in-part of Ser. No. 677,079, Mar. 29, 1991, Pat. No. 5,299,319.

[51] Int. Cl.$^6$ ................................. G06F 9/30
[52] U.S. Cl. ........................ 395/375; 364/736; 364/787; 364/DIG. 1; 364/DIG 2; 395/775; 395/800
[58] Field of Search ............... 364/768, 787; 395/375, 395/775, 800

[56] References Cited

U.S. PATENT DOCUMENTS

| | | | |
|---|---|---|---|
| 4,110,832 | 8/1978 | Leininger et al. | 364/786 |
| 4,819,155 | 4/1989 | Wulf et al. | 395/375 |
| 4,852,040 | 7/1989 | Oota | 364/768 |
| 4,958,312 | 9/1990 | Ang et al. | 364/754 |

Primary Examiner—Ken S. Kim
Attorney, Agent, or Firm—Lynn L. Augspurger; Laurence J. Marhoefer

[57] ABSTRACT

A high speed three-to-one data dependency collapsing ALU can be used to support multiple issue of instructions. The computing apparatus supports multiple issue of instructions it is useful in CISC, superscalar, superscalar RISC, etc. type computer designs. The concept of the ALU is presented along with a detailed description of a design. The apparatus allows the execution of any combination of two independent or dependent arithmetic or logical instructions in a single machine cycle. The 3-1 collapsing ALU structure has a 3-2 carry save adder (CSA); and a 2-1 control arithmetic logic unit (CALU) coupled for an input from the carry save adder; and a first pre-adder logic block coupled with an output to the control arithmetic logic unit; and a control generator; and a second controlled logic block coupled to receive an input from said control generator and having its output coupled to said control arithmetic logic unit. Instructions have an add/logical combinatorial operation which combines all four of the combinations: add-add, add-logical, logical-add, and logical-logical functions; and wherein two or more disassociated ALU operations are specified by a single interlock collapsing ALU which responds to the parallel issuance of a plurality of separate instructions, including RISC type instructions, each of which specifies ALU operations, and the computing apparatus executes the instructions in parallel in a single machine cycle.

8 Claims, 1 Drawing Sheet

3-1 ARITHMETIC LOGIC UNIT FOR SIMULTANEOUS EXECUTION OF AN INDEPENDENT OR DEPENDENT ADD/LOGIC INSTRUCTION PAIR

CROSS-REFERENCE TO RELATED APPLICATION

This application is a continuation of application Ser. No. 07/906,631, filed Jun. 30, 1992, now abandoned, which claims priority and is a continuation in part of the following application:

U.S. patent application Ser. No. 07/677,079 filed Mar. 29, 1991, now issued U.S. Pat. No. 5,299,319, by S. Vassiliadis et al, entitled "High Performance Interlock Collapsing SCISM ALU Apparatus".

The prior application also claims priority of the following co-pending U.S. Patent applications:

(1) Application Ser. No. 07/519,384 (IBM Docket EN9-90-020), filed May 4, 1990, entitled "Scalable Compound Instruction Set Machine Architecture", the inventors being Stamatis Vassiliadis et al;

(2) Application Ser. No. 07/519,382 (IBM Docket EN9-90-019), filed May 4, 1990, entitled "General Purpose Compound Apparatus For Instruction-Level Parallel Processors", the inventors being Richard J. Eickemeyer et al;

(3) Application Ser. No. 07/504,910 (IBM Docket EN9-90-014), filed Apr. 4, 1990, now issued U.S. Pat. No. 5,051,940, entitled "Data Dependency Collapsing Hardware Apparatus", the inventors being Stamatis Vassiliadis et al;

(4) Application Ser. No. 07/522,291 (IBM Docket EN9-90-012), filed May 10, 1990, now issued U.S. Pat. No. 5,214,763 entitled "Compounding Preprocessor For Cache", the inventors being Bartholomew Blaner et al; and (5) Application Ser. No. 07/543,464 (IBM Docket EN9-90-018, filed Jun. 26, 1990, entitled "An In-Memory Preprocessor for a Scalable Compound Instruction Set Machine Processor", the inventors being Richard Eickemeyer et al.

(6) Application Ser. No. 07/543,458, (IBM Docket EN9-90-042) filed Jun. 26, 1990, now issued U.S. Pat. No. 5,197,135 entitled "Memory Management for Scalable Compound Instruction Set Machines" with (7) Application Ser. No. 07/619,868 (IBM Docket EN9-90-033) filed Nov. 28, 1990, now issued U.S. Pat. No. 5,301,341, entitled "Overflow Determination for Three-Operand ALUS in a Scalable Compound Instruction Set Machine", the inventors being Stamatis Vassiliadis et al; and (8) Application Ser. No. 07/642,011 (IBM Docket EN9-90-049) filed Jan. 15, 1991, now issued U.S. Pat. No. 5,295,249, entitled "Compounding Preprocessor for Cache", the inventors being Bartholomew Blaner et al.

(9) Application Ser. No. 677,066, (IBM Docket EN9-90-039, filed Mar. 29, 1991, entitled "System for Compounding Instructions for an Instruction Processor with Different Attributes with Apparatus for Handling Test and Data with Differing Reference Point Information and Backward Compounding Apparatus for Compound Instructions", the inventors being Eickemeyer et al; and

(10) Application Ser. No. 677,685, (IBM Docket EN9-90-040, filed Mar. 29, 1991, now issued U.S. Pat. No. 5,303,356, entitled "System for Preparing Instructions for Instruction Processor and System with Mechanism for Branching in the Middle of a Compound Instruction", the inventors being S. Vassiliadis et al.

These other co-pending applications are not specific to the present invention.

This application and the related applications are assigned to International Business Machines Corporation, Armonk, N.Y. The related applications are incorporated by reference.

FIELD OF THE INVENTION

This invention relates to the field of computing apparatus and Arithmetic Logic Units (ALUs), and particularly to an interlock collapsing apparatus ALU.

BACKGROUND OF THE INVENTION

The need to handle interlocks is common in computing apparatus. There are other solutions. However, as architectures progress the different problems invariably arise. A barrier which arose to achieving super scalar performance with RISC processors, such as those developed originally for the IBM RISC/System 6000 (tm) is that interlocks are serialized so that the traditional super-scalar hardware is underutilized. There is a need to increase utilization of the hardware for a system, especially in the superscalar area where a machine attempts to issue more than one instruction in a given machine cycle or the machine attempts to execute interlocked instructions in a single cycle. The present description of a 3-1 computing apparatus has provided the answer.

SUMMARY OF THE INVENTION

Our architecture which defines instructions that have an "add/logical combinatorial operation" which means combining all four of the following combinations: add-add; add-logical; logical-add; and logical-logical functions, and to an architecture in which two or more disassociated ALU operations are specified by a single interlock collapsing ALUs which responds to the parallel issuance of a plurality of separate instructions (including RISC type instructions), each of which specifies ALU operations, and executes the instructions in parallel in a single machine cycle making the ALU useful in CISC, superscalar, superscalar RISC, etc. type computer designs.

In accordance with our invention we have designed a three-to-one ALU which provides a way to execute plural instructions in a given machine cycle and which can execute interlocked instructions in a single cycle. The computing apparatus, the 3-1 ALU has the ability to execute with a 3-1 two's complement and unsigned number notation a pair of interlocked instructions. The 3-1 ALU has a 3-2 carry save adder (CSA); and a 2-1 control arithmetic logic unit (CALU) coupled for an input from the carry save adder; and a first pre-adder logic block coupled with an output to the control arithmetic logic unit; and a control generator; and a second controlled logic block coupled to receive an input from said control generator and having its output coupled to said control arithmetic logic unit.

In the 3-1 ALU we have provided that the output of the pre-adder logical block is combined with a sum from the CSA and a CSA sum control. The control generator has control inputs which it combines with a third operand; and the second controlled logic block combines a half-sum and modified half-sum from the CALU with the output of the control generator to produce controls for the CALU for incorporating post-adder logical functions into the CALU.

We also provide bitwise AND, OR, XOR, NOR, NAND, or XNOR functions into the CALU for executing the catogories:

Category 2: B+(A LOP Γ) Logical followed by Arithmetic; and

Category 3: B LOP (A+Γ) Arithmetic followed by Logical; and

Category 4: B LOP (A LOP Γ) Logical followed by Logical.

This ALU, when used in conjunction with a regular two-to-one ALU as expected and done in our preferred embodiment allows simultaneous execution of any combination of two independent or dependent arithmetic or logical instruction types. Because the three-to-one ALU has been designed to be fast (considerable faster than two ALUs connected in series) it allows the execution of the two arithmetic or logical instruction types identified above to be executed in one machine cycle without increasing the cycle time. The concept is particularly useful for superscalar, superscalar RISC, and other machines attempting to issue more than one instruction in a given machine cycle or machines that attempt to execute interlocked instructions in a single cycle.

DETAILED DESCRIPTION OF THE PREFERRED EMBODIMENTS

Figure 1:
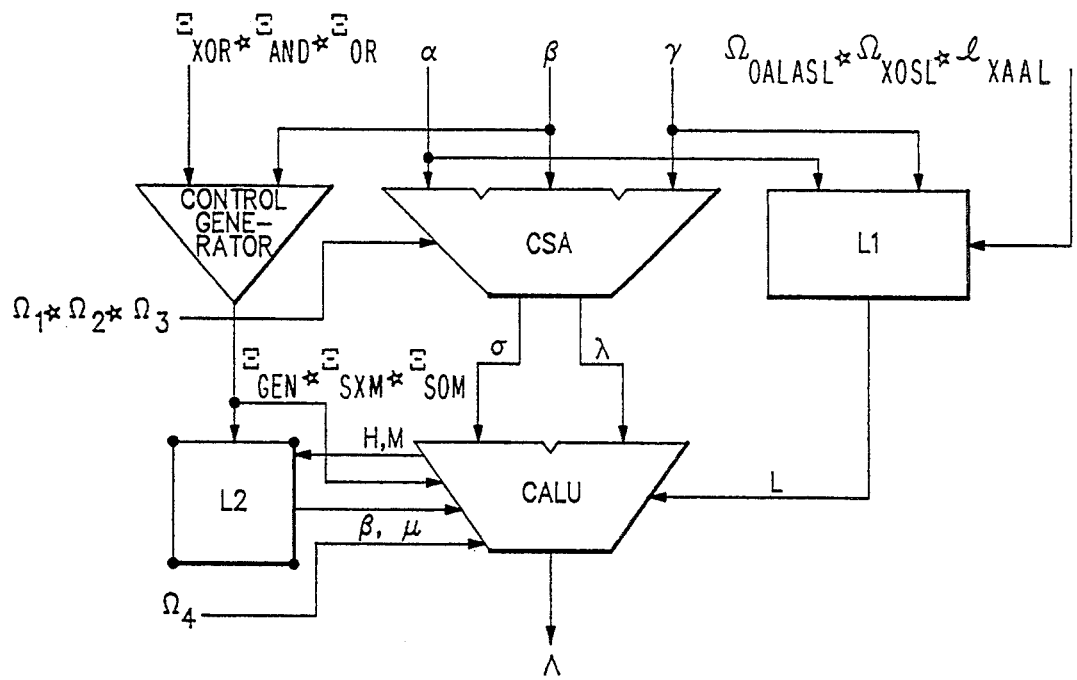
FIG. 1 illustrates a our preferred embodiment. This is the logical dataflow for our interlock collapsing 3-1 execution ALU.

In FIG. 1 is shown a high level description of the 3-1 Arithmetic Logic Unit (ALU). All operands to the ALU are fed to a Carry Save Adder (CSA) where, for add type operations, the three operands are reduced to a sum and a carry to be fed to the subsequent Control Arithmetic Logic Unit (CALU) in which a special addition can be performed. In addition, the left and right operands are fed to a first logic block or logic unit, L1, where logical operations are performed when collapsing a dependency between a logic instruction followed by an arithmetic. This logic block handles add functions followed by a logic function, as well as a logic function followed by a logic function. The middle operand is fed to a control generator, along with the ALU control inputs that specify the operation of the CALU, where controls for the CALU are generated. The CALU responds to these controls in such a manner to allow the fast generation of the bitwise logic operations between the middle input and the sum that would result from a regular two-to-one addition. To allow the CALU to perform its operation, a second controlled logic block L2 receives signals H and M from the CALU and produces signals θ and m to allow the generation of these bitwise logic operations between the middle input and the sum from a two-to-one addition. Controlled logic block L2 handles a logic function followed by a add, as well as a logic function followed by a logic function.

Figure 2:
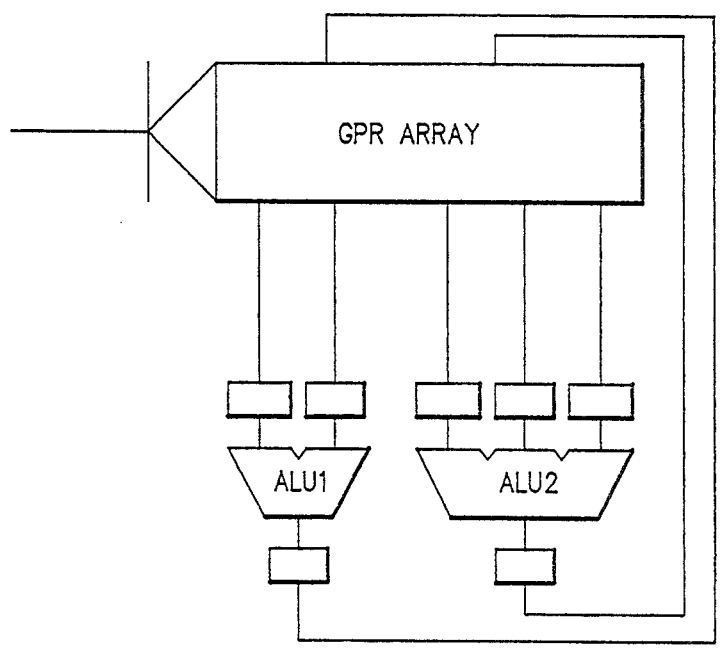
FIG. 2 shows our preferred ALU in combination with a regular two-to-one ALU. This combination uses the ALU for simultaneous execution of two arithmetic or logical instructions.

FIG. 2 demonstrates the use of the 3-1 ALU along with a standard 2-1 ALU to support the simultaneous execution of any combination of two dependent or independent arithmetic or logical type instructions. The 2-1 ALU executes the first of the two issued instructions while the 3-1 ALU executes the second dependent or independent instruction.

FIG. 1 shows an overview of the three-to-one ALU being disclosed. Such an ALU designed in compliance with the ESA/370 instruction set is described by the following equations:

$$\Lambda_i = \mu_i \phi_{i+1} + \theta_i \overline{\phi}_{i+1} + \Xi_{SOMi}$$

$$\theta_i = H_i \Xi_{GENi} + \overline{H}_i \Xi_{SXMi}$$

$$\mu_i = M_i \Xi_{GENi} + \overline{M}_i \Xi_{SXMi}$$

$$G_{i+1}^{*n} = G_{i+1}^n + \Xi_{SOMi}$$

$$L_i = \alpha_i \Omega_{OALASL} + \gamma_i \Omega_{OALASL} + \overline{\alpha_i \gamma_i} \Omega_{XOSL} + \overline{\alpha_i \gamma_i} \Omega_{XAAL}$$

$$\Xi_{GENi} = \Xi_{ADD} + \Xi_{OR} + \beta_i \Xi_{AND} + \overline{\beta}_i \Xi_{XOR}$$

$$\Xi_{SXMi} = \beta_i \Xi_{XOR} + \overline{\beta}_i \Xi_{NOR}$$

$$\Xi_{SOMi} = \beta_i \Xi_{OR}$$

$$\sigma_i = \alpha_i \lor \beta_i \lor \gamma_i$$

$$\lambda_i = \Omega_1 \alpha_i \beta_i + \Omega_2 \alpha_i \gamma_i + \Omega_1 \beta_i \gamma_i + \Omega_3 \beta_{i-1}$$

$$H_i = (\Omega_4 \sigma_i + L_i) \lor \lambda_{i+1}$$

$$G_i = (\Omega_4 \sigma_i + L_i) \lambda_{i+1}$$

$$T_i = \Omega_4 \sigma_i + L_i + \lambda_{i+1}$$

where $\Omega_1$, $\Omega_2$, $\Omega_3$, $\Omega_4$, $\Omega_{OALASL}$, $\Omega_{XAAL}$, $\Omega_{XOSL}$, $\Xi_{ADD}$, $\Xi_{OR}$, $\Xi_{NOR}$, and $\Xi_{XOR}$ are control signals, $\phi_i$, $M_i$, $G_i^n$, and $T_i^n$ are parameters for recursive CLA equations as defined in "Recursive Equations for Hardwired Binary Adders", Int. J. Electronics, Vol 67, No. 2, pp201–213, and $\alpha_i$, $\beta_i$, and $\gamma_i$ are inputs to the ICALU.

In the following, it is shown that the above equations describing the ALU perform the functions required for collapsing interlocks for the ALU instructions contained in a RISC instruction sets. For ease of discussion, the MIPs instruction set has been chosen as an example of such an instruction set and is used in the following discussion. The MIPS ALU instructions can be divided into the following six categories:

signed arithmetic operations ADDI, ADD, SUB
unsigned arithmetic operations ADDIU, ADDU, SUBU
signed arithmetic compare SLTI, SLT
unsigned arithmetic compare SLTIU, SLTU
logical operations NR, OR, XR, NOR
load register LR These six instruction categories can be abstracted to two categories: arithmetics and logicals in which arithmetic covers signed arithmetic operations, unsigned arithmetic operations, signed arithmetic compare, unsigned arithmetic compare, and load register while logicals covers logical operations. With this abstraction, consideration of the combinations of the instruction categories indicates that the majority of interlocks can be collapsed by supporting the execution of the following categories of ALU operations in the three-to-one ALU:

Category 1: $\alpha+\beta+\gamma$ Arithmetic followed by Arithmetic

Category 2: $\beta+(\alpha \text{ LOP } \gamma)$ Logical followed by Arithmetic

Category 3: $\beta \text{ LOP } (\alpha+\gamma)$ Arithmetic followed by Logical

Category 4: $\beta \text{ LOP } (\alpha \text{ LOP } \gamma)$ Logical followed by Logical.

in which $\alpha$, $\beta$, and $\gamma$ represent the three operands upon which the ALU is to operate, +represents binary addition (and covers signed or unsigned addition, subtraction or comparison since subtraction can be obtained by adding the ones complement of the subtrahend to the minuend and supplying a 'hot one' to the adder), and LOP represents one of the bitwise logical operations of OR, AND, EXCLUSIVE-OR, or NOR.

First consider the ALU description in light of execution of the first category of ALU operations. For this category, controls are supplied to the ALU as:

$$\Omega_1=\Omega_2=\Omega_4=1$$

$$\Omega_3=0$$

$$\Xi_{ADD}=1$$

$$\Xi_{OR}=\Xi_{AND}=\Xi_{XOR}=\Xi_{NOR}=0$$

$$\Omega_{OALASL}=\Omega_{XOSL}=\Omega_{XAAL}=0$$

from which it follows from the above equations that:

$$\Xi_{GENi}=1$$

$$\Xi_{SXMi}=\Xi_{SOMi}=0$$

$$L_i=0$$

$$\sigma_i=\alpha_i \lor \beta_i \lor \gamma_i$$

$$\lambda_i=\alpha_i\beta_i+\alpha_i\gamma_i+\beta_i\gamma_i$$

$$H_i=\sigma_i \lor \lambda_{i+1}$$

$$G_i=\sigma_i\lambda_{i+1}$$

$$T_i=\sigma_i+\lambda_{i+1}$$

$$\mu_i=M_i(1)+\overline{M_i(0)}=M_i$$

$$\theta_i=H_i(1)+\overline{H_i(0)}=H_i$$

$$G_{i+1}^{\uparrow n}=G_{i+1}^{*n}$$

$$\Lambda_i=M_i\phi_{i+1}+H_i\overline{\phi_{i+1}}+0=M_i\phi_{i+1}+\overline{H_i\phi_{i+1}}$$

But since $\sigma_i$ and $\lambda_i$ represent the sum and carry from a three-to-two CSA, and since $\phi_i$ represents the new carry of a two-to-one CLA whose inputs are the sum from the three-to-two CSA added to the carry from the CSA shifted left one bit position, then, making use of the recursive equations for binary adders taught by Vassiliadis, $\Lambda_i$ becomes the sum, $\alpha_i+\beta_i+\gamma_i$ as desired.

Next consider the execution of the second category of ALU operations. For this category $\Omega_{OALASL}$, $\Omega_{XOAL}$, and $\Omega_{XAAL}$ are asserted along with the appropriate polarity of the operands to produce the one of the logic functions AND, OR, XOR, NAND, NOR, XNOR between the left and right inputs, $\alpha_i$ and $\gamma_i$. In addition, the remaining controls are asserted as:

$$\Omega_1=\Omega_2=\Omega_4=0$$

$$\Omega_3=1$$

$$\Xi_{ADD}=1$$

$$\Xi_{OR}=\Xi_{AND}=\Xi_{XOR}=\Xi_{NOR}=0$$

from which it follows from the above equations that:

$$\Xi_{GENi}=1$$

$$\Xi_{SXMi}=\Xi_{SOMi}=0$$

$$L_i=[\text{AND,OR,XOR,NAND,NOR,XNOR}]$$

$$\sigma_i=\alpha_i \lor \beta_i \lor \gamma_i$$

$$\lambda_i=\beta_{i-1}$$

$$H_i=L_i \lor \lambda_{i+1}=L_i \lor \beta_i$$

$$G_i=L_i\lambda_{i+1}=L_i\beta_i$$

$$T_i=L_i+\lambda_{i+1}=L_i+\beta_i$$

$$\mu_i=M_i(1)+\overline{M_i(0)}=M_i$$

$$\theta_i=H_i(1)+\overline{H_i(0)}=H_i$$

$$G_{i+1}^{\uparrow n}=G_{i+1}^{*n}$$

$$\Lambda_i=M_i\phi_{i+1}+H_i\overline{\phi_{i+1}}+0=M_i\phi_{i+1}+\overline{H_i\phi_{i+1}}$$

But since $L_i$, which is $(\alpha_i\text{LOP}\gamma_i)$, and $\gamma_i$, which is $\beta_{i-1}$, are fed to the two-to-one adder with $\lambda_i$ shifted left one bit position, a new carry is generated which complies with the new carry for adding $\beta_i+(\alpha_i\text{LOP}\gamma_i)$. From the recursive equations for binary adders of Vassiliadis, $\Lambda_i$ is taught to produce the required sum: $\beta_i+(\alpha_i\text{LOP}\gamma_i)$.

Thirdly, consider the execution of the third category of ALU operations. For this category $\Omega_{QALASL}$ is asserted as a logic zero, while $\Omega_{XOSL}$ and $\Omega_{XAAL}$ are both asserted as logic one. The polarity of the third input, $\Gamma$, is either positive or negative, respectively, for addition or subtraction between A and $\Gamma$. The controls for the CALU indicate one of the bitwise logical functions to be executed by the CALU. In the following example, the EXCLUSIVE-OR function is assumed; therefore, the example demonstrates the operation: $B \lor (A+\Gamma)$. To execute this function, the remaining controls are asserted as:

$$\Omega_1=\Omega_3=\Omega_4=0$$

$$\Omega_2=1$$

$$\Xi_{XOR}=1$$

$$\Xi_{ADD}=\Xi_{OR}=\Xi_{AND}=\Xi_{NOR}=0$$

From the above setting of the controls along with the expressions specifying the operation of the three-to-one ALU, the results are produced by:

$$\Xi_{GENi}=\overline{\beta_i}$$

$\Xi_{SXMi}=\beta_i$ $\Xi_{SOMi}=0$ $L_i=\alpha_i \veebar \gamma_i$ $\sigma_i=\alpha_i \veebar \beta \veebar \gamma_i$ $\lambda_i=\alpha_i\gamma_i$ $H_i=L_i \veebar \lambda_{i+1}$ $G_i=L_i\lambda_{i+1}$ $T_i=L_i+\lambda_{i+1}$ $\mu_i=M_i\overline{\beta_i}+\overline{M_i}\beta_i$ $\theta_i=H_i\overline{\beta_i}+\overline{H_i}\beta_i$ $G_{i+1}^{\dagger n}=G_{i+1}^{*n}$ $$\begin{aligned}\Lambda_i &= (M_i\overline{\beta_i} + \overline{M_i}\beta_i)\phi_{i+1} + (H_i\overline{\beta_i} + \overline{H_i\beta_i})\overline{\phi_{i+1}} \\ &= M_i\overline{\beta_i}\phi_{i+1} + \overline{M_i}\beta_i\phi_{i+1} + H_i\overline{\beta_i}\overline{\phi_{i+1}} + \overline{H_i\beta_i}\overline{\phi_{i+1}} \\ &= \overline{\beta_i}(M_i\phi_{i+1} + H_i\overline{\phi_{i+1}}) + \beta_i(\overline{M_i}\phi_{i+1} + \overline{H_i}\overline{\phi_{i+1}}) \\ &= \overline{\beta_i}(M_i\phi_{i+1} + H_i\overline{\phi_{i+1}}) + \beta_i[\overline{M_i}\phi_{i+1} + (\overline{H_i} + 1) + \overline{H_i}\overline{\phi_{i+1}}(M_i + 1)] \\ &= \overline{\beta_i}(M_i\phi_{i+1} + H_i\overline{\phi_{i+1}}) + \beta_i[\overline{M_i H_i}\phi_{i+1} + \overline{M_i H_i}\phi_{i+1} + \overline{H_i}\overline{\phi_{i+1}} + \overline{M_i}\overline{\phi_{i+1}}] \\ &= \overline{\beta_i}(M_i\phi_{i+1} + H_i\overline{\phi_{i+1}}) + \beta_i[\overline{M_i H_i}(\phi_{i+1} + \overline{\phi_{i+1}}) + \overline{H_i}\overline{\phi_{i+1}} + \overline{M_i}\overline{\phi_{i+1}}] \\ &= \overline{\beta_i}(M_i\phi_{i+1} + H_i\overline{\phi_{i+1}}) + \beta_i[\overline{M_i H_i} + \overline{H_i}\overline{\phi_{i+1}} + \overline{M_i}\overline{\phi_{i+1}}] \\ &= \overline{\beta_i}(M_i\phi_{i+1} + H_i\overline{\phi_{i+1}}) + \beta_i[\overline{(M_i + \overline{\phi_{i+1}})(H_i + \phi_{i+1})}] \\ &= \overline{\beta_i}(M_i\phi_{i+1} + H_i\overline{\phi_{i+1}}) + \beta_i[\overline{M_i\phi_{i+1} + H_i\overline{\phi_{i+1}}}]\end{aligned}$$

But since $L_i$ and $\lambda_i$ represent the sum and carry from a two-to-two addition between A and $\Gamma$, and since $L_i$ and $\lambda_i$ are fed to a two-to-one adder with $\lambda_i$ shifted left one bit position, and finally since $\sigma_i$, though fed to the two-to-one adder is deselected by $\Omega_4=0$, the recursive equations of Vassiliadis teach that $M_i\phi_{i+1}+H_i\overline{\phi_{i+1}}$ represents the sum, $A+\Gamma$. Letting $S_i$ represent the sum $A+\Gamma$ at bit position i, then:

$S_i = M_i\phi_{i+1} + H_i\overline{\phi_{i+1}}$

Substituting $S_i$ into the results from the three-to-one ALU gives:

$\Lambda_i = \overline{\beta_i}S_i + \beta_i\overline{S_i} = \beta_i \veebar S_i$ Thus, the result is the bitwise logical EXCLUSIVE-OR between B and S. But S is the sum $A+\Gamma$; therefore, the result is:

$\Lambda = B \veebar (A+\Gamma)$ where in this later expression $\veebar$ represents the bitwise EXCLUSIVE-OR operation and + represents addition.

Finally, consider the last category of operations, category four. For this category, the three-to-one ALU is shown to produce the desired results for the bitwise logical operations AND followed by NOR. Thus, the result should be $\overline{B+(A\Gamma)}$. The controls to the ALU are:

$\Omega_1=\Omega_2=\Omega_3=\Omega_4=0$ $\Omega_{XAAL}=1$ $\Omega_{OALASL}=\Omega_{XOSL}=0$ $\Xi_{NOR}=1$ $\Xi_{ADD}=\Xi_{OR}=\Xi_{AND}=\Xi_{XOR}=0$ from which the results are produced by:

$\Xi_{GENi}=0$ $\Xi_{SXMi}=\overline{\beta_i}$ $\Xi_{SOMi}=0$ $L_i=\alpha_i 0+\gamma_i 0+\overline{\alpha_i\gamma_i}0+\alpha_i\overline{\gamma_i}1=\alpha_i\overline{\gamma_i}$ $\sigma_i=\alpha_i \veebar \beta_i \veebar \gamma_i$ $\lambda_i=0$ $H_i=(0\sigma_i+L_i)\veebar 0=L_i$ $G_i=(0\sigma_i+L_i)0=0$ $T_i=0\sigma_i+L_i+0=L_i$ $\mu_i=M_i 0+\overline{M_i}\overline{\beta_i}=\overline{M_i}\overline{\beta_i}$ $\theta_i=H_i 0+\overline{H_i}\overline{\beta_i}=\overline{H_i}\overline{\beta_i}$ Because 'hot ones' are not supplied to the three-to-one ALU for executing category four and since the pseudo-generate $G_i$ is a logic zero at each bit position i, the new carry $\phi_{i+1}=0$. Therefore, $\Lambda_i=\mu_i 0+\theta_i 1+0=\theta_i$ $\Lambda_i=\overline{H_i}\overline{\beta_i}$ $\Lambda_i=\overline{L_i}\overline{\beta_i}$ But $L_i=\alpha_i\overline{\gamma_i}$; therefore, $\Lambda_i=\overline{\beta_i}(\overline{\alpha_i\overline{\gamma_i}})$ $\Lambda_i=\overline{\beta_i+(\alpha_i\overline{\gamma_i})}$ Also, for this category, the operands, B and A are fed to the ALU while the ones complement of the operand $\Gamma$ is supplied to the ALU. Therefore, $\overline{\gamma_i}=\Gamma_i$. Substituting these into the last expression for the result produces:

$\Lambda_i=\overline{B_i+(A_i\Gamma_i)}$ or $\Lambda=\overline{B+(A\Gamma)}$ where + represents the bitwise logical OR. Thus, the AND-NOR function is achieved as desired.

The computing apparatus with the 3-1 ALU which we have described in a preferred embodiment has been combined as shown in FIG. 2 with a conventional 2-1 ALU (ALU1) wherein both the 3-1 computing apparatus 3-1 ALU (ALU2) and the 2-1 ALU (ALU1) share a common general purpose register array (GPR Array) having five read ports, one independent port for each of the ALUs' inputs, and two write ports, one for each of the ALUs' results. Thus, the first of an instruction pair, specifying ALU operations, is executed by the 2-1 ALU with the second instruction executed in the identical machine cycle and in parallel with the first instruction, by the 3-1 ALU even when the instruction data dependency interlocks as shown in FIG. 2.

Such a combined computing apparatus can provide an architecture which executes instructions that have an "add/logical combinatorial operation" which means combining all four of the following combinations: add-add; add-logical; logical-add; and logical-logical functions, and wherein two or more disassociated ALU operations are specified by a single interlock collapsing ALU which responds to the parallel issuance of a plurality of separate instructions, including RISC type instructions, each of which specifies ALU operations, and the computing apparatus executes the instructions in parallel in a single machine cycle. With such a combined apparatus a computer system apparatus can execute combinations of two independent or dependent arithmetic or logical instruction types and the execution of the two arithmetic or logical instruction types in one machine cycle without increasing cycle time.

While we have described our preferred embodiments of our invention, it will be understood that those skilled in the art, both now and in the future, may make make various improvements and enhancements which fall within the scope of the claims which follow. These claims should be construed to maintain the proper protection for the invention first disclosed.

What is claimed is:

1. A computing apparatus for executing an add/logic instruction pair combinational operation in a single machine cycle irrespective of whether there is an instruction interlock between said instruction pair, comprising in combination:

a carry save adder having three inputs, namely a first input, a second input and a third input, to which are coupled respectively three operands, namely a first operand, a second operand, and a third operand of said instruction pair and having two outputs representing respectively a sum and a carry of said three inputs;

a control arithmetic logic means for performing bitwise logic operations between said second operand connected to said second input and a two-to-one addition of said first and third operands, said control arithmetic logic means having two inputs coupled respectively to said two outputs of said carry save adder;

a first logic means having two inputs and an output for performing a logical operation to collapse a dependency between a logical instruction followed by an arithmetic instruction;

means coupling said first input and said third input respectively to said two inputs of said first logic means and means coupling said output of said first logic means to said control arithmetic logic means;

a control generator means for generating control signals for controlling the post-adder logic operations of said control arithmetic logic means said control generator means having one input coupled to said second input of said carry save adder and another input coupled to a control input that specifies an operation of said control arithmetic logic means;

a second logic means having one input coupled to an output of said control generator means;

said second logic means generating an output to control post-adder logic operation of said control arithmetic logic means including bitwise logic operations between said second input to said carry save adder means and a two-to-one addition of two of said operand means; and means coupling said output of said second logic means to said control arithmetic logic means.

2. The computing apparatus according to claim 1 wherein said second logic means combines a half-sum and modified half-sum from the control arithmetic logic unit with the output of the control generator means to produce said output to control post-adder logical functions in the control arithmetic logic unit.

3. The computing apparatus according to claim 2 wherein the ALU operations are characterized by the form of:

Category 1: $A + B + \Gamma$ Arithmetic followed by Arithmetic

Category 2: $B + (A \text{ LOP } \Gamma)$ Logical followed by Arithmetic

Category 3: $B \text{ LOP } (A + \Gamma)$ Arithmetic followed by Logical

Category 4: $B \text{ LOP } (A \text{ LOP } \Gamma)$ Logical followed by Logical.

where A, B, and $\Gamma$ correspond to the operands supplied to the computing apparatus.

4. The computing apparatus according to claim 2 wherein the output of the first logic means for collapsing the dependency between a pair of instructions logical followed by arithmetic and logical followed by logical produced by $L_i$ where $L_i$ is calculated by:

$$L_i = a_i \Omega_{OALASL} + \gamma_i \Omega_{OALASL} + \overline{a_i} \gamma_i \Omega_{XOSL} + a_i \overline{\gamma_i} \Omega_{XAAL}.$$

$\Omega_{OALASL}$, $\Omega_{XOSL}$, and $\Omega_{XAAL}$ are control functions asserted with proper polarity of input operands to produce bitwise logical functions AND, OR, XOR, NAND, NOR, and XNOR as required for instruction set implementation as well as for logical followed by add/subtract operations.

5. The computing apparatus according to claim 4 wherein the output of the pre-adder logical block requires the same number of logic stages as a 3-2 CSA.

6. The computing apparatus according to claim 2 wherein a carry output of said carry save adder is produced according to:

$$\lambda_i = \Omega_1 a_i \beta_i + \Omega_2 a_i \gamma_i + \Omega_1 \beta_i \gamma_i + \Omega_3 \beta_{i-1}$$

where $\Omega_1$, $\Omega_2$, and $\Omega_3$ are control signals allowing the carry output from the carry save adder to supply 3-2 carry for a first category of operations Category 1: $A + B + \Gamma$ Arithmetic followed by Arithmetic; and the third operand permits executing a second category Category 2: $B + (A \text{ LOP } \Gamma)$ Logical followed by Arithmetic; and the carry corresponding to a 2-2 carry permits executing a third category Category 3: $B \text{ LOP } (A + \Gamma)$ Arithmetic followed by Logical; and a logic 0 causes executing of a fourth category Category 4: $B \text{ LOP } (A \text{ LOP } \Gamma)$ Logical followed by Logical; and the subscripts 1, 2 and 3 represent respective control signals.

7. The computing apparatus according to claim 2 wherein said output of said logic means controls bitwise AND, OR XOR, NOR, NAND, or XNOR functions in the control arithmetic logic unit for executing the categories:

Category 2: B+(A LOP Γ) Logical followed by Arithmetic; and

Category 3: B LOP (A+Γ) Arithmetic followed by Logical; and

Category 4: B LOP (A LOP Γ) Logical followed by Logical.

8. The computing apparatus according to claim 2 wherein a control signal controls selection between a sum from said carry save adder and an output of said first logic means as one input of said control arithmetic logic unit in parallel with a generation of transmit, generate, and half-sums required for implementing a control arithmetic logic unit function.

* * * * *